Aug. 1, 1950  V. M. ARMAN  2,517,162
TRAILER-TYPE MOTOR ATTACHMENT FOR BICYCLES
Filed June 4, 1948  3 Sheets-Sheet 1

Inventor
VICTOR M. ARMAN
By *Patrick D. Beavers*
Attorney

Aug. 1, 1950  V. M. ARMAN  2,517,162
TRAILER-TYPE MOTOR ATTACHMENT FOR BICYCLES
Filed June 4, 1948  3 Sheets-Sheet 2

Inventor
VICTOR M. ARMAN

By *Patrick D. Beavers*

Attorney

Inventor
VICTOR M. ARMAN

Patented Aug. 1, 1950

2,517,162

UNITED STATES PATENT OFFICE 2,517,162

TRAILER-TYPE MOTOR ATTACHMENT FOR BICYCLES

Victor M. Arman, Clarington, Ohio

Application June 4, 1948, Serial No. 31,128

2 Claims. (Cl. 180—13)

The present invention relates to trailer-type attachment for bicycles and it consists in the combinations, constructions and arrangements of parts herein described and claimed.

It is an object of the present invention to provide a motor attachment for bicycles which may be formed as a unitary apparatus and which may be quickly and easily attached and detached for a conventional bicycle.

Another object of the invention is the provision of simple means for controlling the speed and braking means forming a part of the invention.

Another object of the invention is the provision of a novel universal connection between a power trailer forming a part of the invention and a conventional bicycle.

A further object of the invention is the provision of a novel mounting for a motor and tractor wheel forming a part of the invention.

A still further object of the invention is the provision of a novel frame for a bicycle trailer and a motor platform associated therewith.

Other and further objects of the invention will become apparent from a reading of the following specification taken in conjunction with the drawings, in which:

Figure 7 is an enlarged fragmentary sectional view showing certain elements of the invention, and Figure 8 is a fragmentary perspective view of a universal connection forming a part of the invention.

Figure 1:
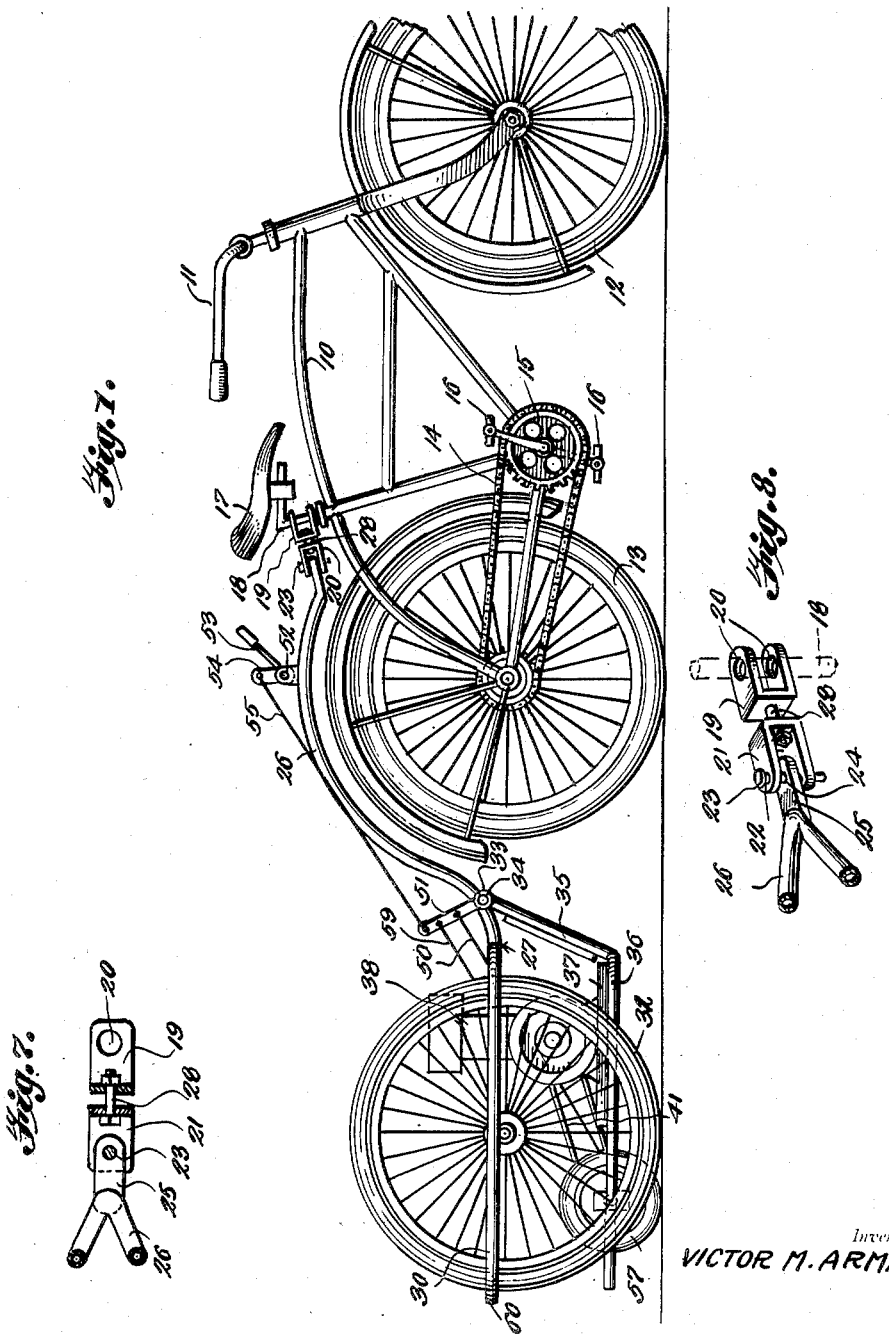
Figure 1 is a side elevational view of an embodiment of the invention.
Figure 2:
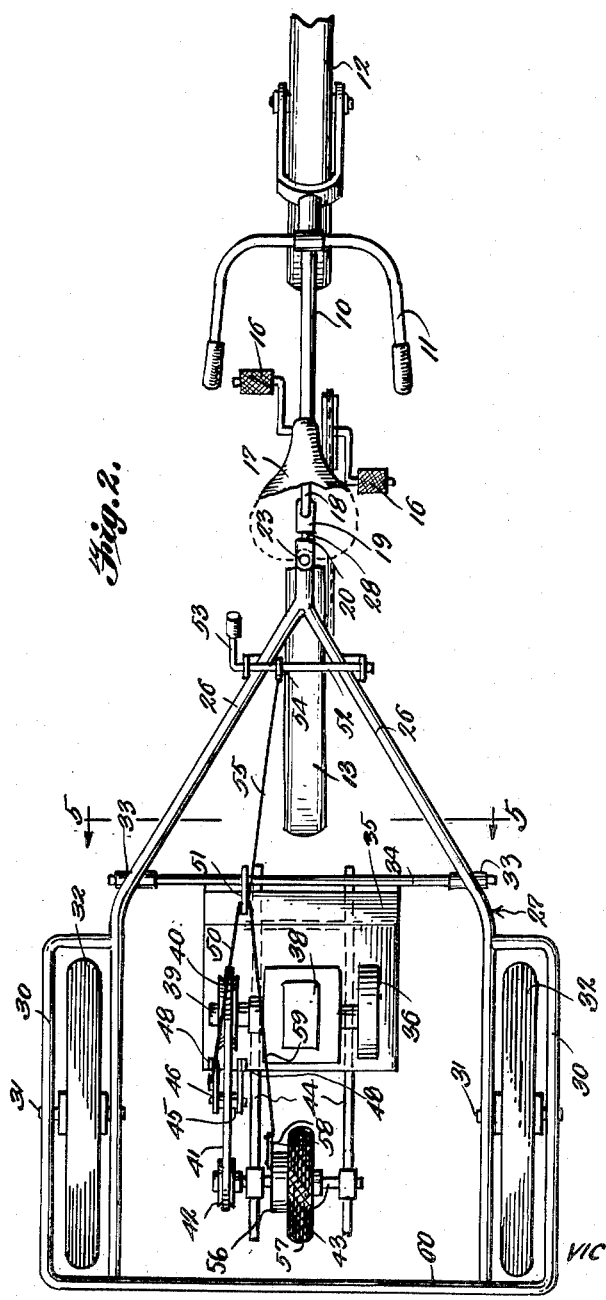
Figure 2 is a plan view thereof.
Figure 3:
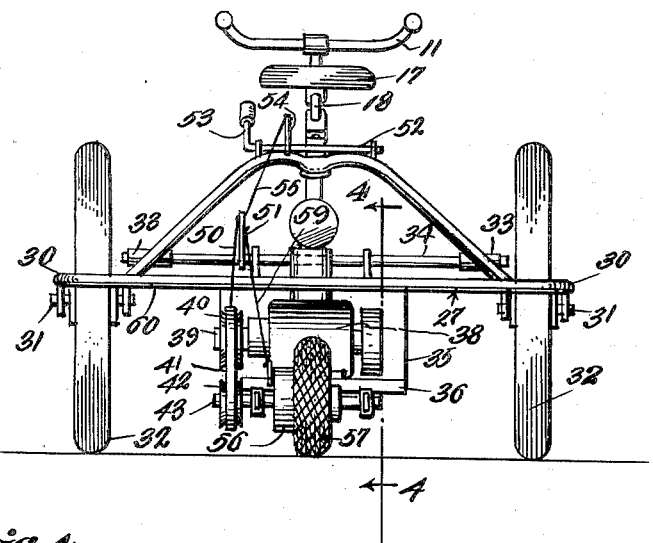
Figure 3 is a rear elevational view of the device shown in Figures 1 and 2.
Figure 4:
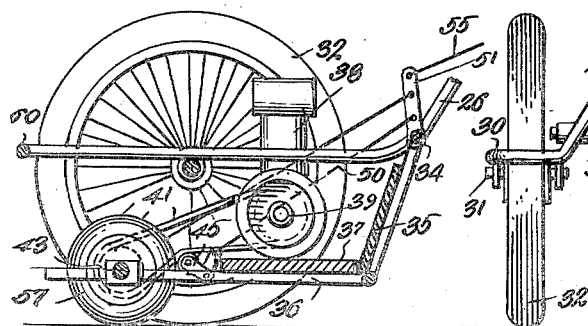
Figure 4 is a sectional view taken along line 4—4 of Figure 3.
Figure 5:
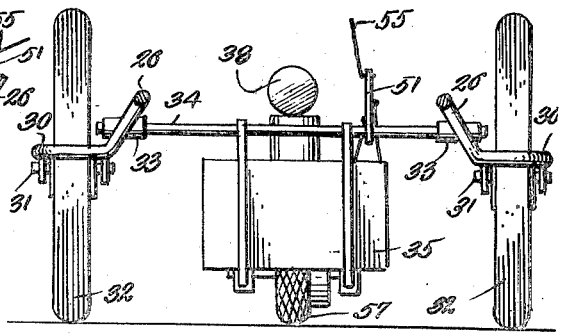
Figure 5 is a sectional view taken along line 5—5 of Figure 2.

Generally there is provided an attachment for a bicycle having a novel universal connection between the saddle post of a conventional bicycle and the forwardly extending yoke of a trailer which comprises an open framework of tubular construction which is supported by a pair of bicycle-type wheels and which has pivotally suspended therefrom a platform supporting a motor which is adapted to drive a tractor wheel which is in contact with the ground. Novel lever operated means is provided for controlling a belt between the axle for the drive wheel and the motor and novel means is also provided for simultaneously controlling a brake forming a part of the invention. The entire apparatus may be quickly attached to and detached from the conventional bicycle.

Referring more particularly to the drawings, there is shown therein a conventional bicycle 10 provided with handlebars 11 for a steering wheel 12 and a rear wheel 13 having conventional chain connection 14 with a sprocket 15 having pedals 16 for normal foot operation of the bicycle. The bicycle is also provided with a saddle 17 mounted upon a conventional saddle post 18.

A U-shaped bracket 19 is provided with holes 20 through which the saddle post may be extended for the permanent mounting of the same thereon. A similar bracket 21 is provided with holes 22 for the reception of a pin 23 which extends therethrough and through an opening 24 in a tongue 25 formed at the forward end of a yoke 26 of a trailer frame generally indicated at 27. The brackets 19 and 21 are interconnected by means of a bolt 28.

The frame 27 is generally rectangular and is provided with a pair of outwardly extending brackets 30 which are integrally formed with the frame and in each of which is mounted an axle 31 upon which a wheel 32 is freely revoluble.

Journals 33 are affixed adjacent the rear end of the yoke 26 for the reception of a revolubly mounted axle member 34 to which is centrally affixed a downwardly and rearwardly extending support 35 for a horizontally and rearwardly extending platform 36 upon which is mounted the base 37 of a motor 38 which is preferably an internal combustion engine.

The motor is provided with a shaft 39 upon which is mounted a pulley 40 which is interconnected by means of a belt 41 with a pulley 42 affixed to a shaft 43 which is journalled in the outer ends of a pair of rearwardly extending brackets 44 carried by the platform 36.

Figure 6:
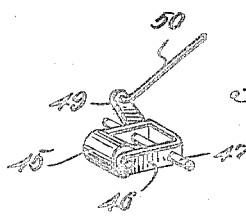
Figure 6 is a perspective view illustrating certain elements of the invention.

A belt tightener, illustrated clearly in Figure 6, is provided and consists of a roller 45 adapted to bear against the belt 41 and which is carried by a U-shaped bracket 46 provided with a transversely extending pin 47 and the pin 47 is pivotally mounted upon the platform 36, as indicated at 48. An arm 49 is affixed to the bracket 46 and a cable 50 is attached to the outer end thereof and to a lever 51 pivotally mounted upon the axle member 34.

Forwardly upon the yoke 26 and immediately to the rear of the saddle 17 is pivotally mounted a transversely extending rod 52 having an operating handle 53. A lever 54 is affixed to the rod 52 and a cable 55 interconnects the lever 51 and the lever 54. A brake 56 is provided for a tractor wheel or drive wheel 57 which is mounted upon the axle 43 and has a spring retracted operating lever 58 which is interconnected by means of a cable 59 with the lever 51.

In operation, it will be apparent that, in order to attach the trailer to the bicycle it is only necessary to insert the pin 23 through the bracket 21 and the tongue 25. Thereupon the motor 38 may be started and the operator may then move the handle 53 forwardly thereby causing the belt tightener to come into contact with the belt 41 to thereby transmit power from the motor 38 to the tractor wheel 57. By regulating the degree of tension of the belt tightener upon the belt, the speed of the vehicle may be controlled easily by the operator through the use of the handle 53. Release of the handle 53 will not only allow the belt tightener to disengage from the belt 41 but will also allow the spring-actuated brake lever 58 to set the brake 56. It will be apparent that the universal connection illustrated clearly in Figure 8 of the drawings, will allow not only vertical movement of the trailer with respect to the bicycle but will also allow transverse movement thereof in like manner. It will also be seen that the platform 36, being pivotally connected through its support 35 and the axle member 34, will provide traction for the wheel 57 through its own weight and the weight of the motor 38 thereon. It will also be apparent that the rear end of the frame 27 provides a bumper 60 for the trailer.

In addition to the above described means for regulating the speed of the vehicle by the degree of tension of the belt tightener upon the belt, it will be understood that there will also be provided a throttle of conventional character for regulating the flow of fuel to the engine.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising in combination, a bicycle, a saddle post for the bicycle, a trailer having a frame, a yoke extending forwardly of the frame, wheels for supporting the frame, a platform pivotally connected to the frame, a motor mounted on the platform, a tractor wheel carried by the platform and having operable connection with the motor and a universal connection between the yoke and the saddle post.

2. An apparatus of the character described comprising, in combination, a bicycle, a saddle post for the bicycle, a trailer having a frame, a yoke extending forwardly of the frame, wheels for supporting the frame, a platform pivotally connected to the frame, a motor mounted on the platform, a tractor wheel carried by the platform, a belt operably connecting the motor and the tractor wheel, a belt-tightener mounted on the platform, means for remotely controlling the belt-tightener and a universal connection between the yoke and the saddle post.

VICTOR M. ARMAN.

REFERENCES CITED

The following references are of record in the file of this patent:

UNITED STATES PATENTS

| Number | Name | Date |
|---|---|---|
| 820,102 | Ouer | May 8, 1906 |
| 1,165,467 | Tideman | Dec. 28, 1915 |
| 1,341,379 | Mauclain et al. | May 25, 1920 |

FOREIGN PATENTS

| Number | Country | Date |
|---|---|---|
| 29,345 | Great Britain | Dec. 19, 1913 |